United States Patent [19]
Yamamoto et al.

[11] Patent Number: 5,215,651
[45] Date of Patent: Jun. 1, 1993

[54] PROCESS FOR PRODUCING COKE

[75] Inventors: Iwao Yamamoto, Yokohama; Kenji Watanabe, Sagamihara, both of Japan

[73] Assignee: Mitsubishi Kasei Corporation, Tokyo, Japan

[21] Appl. No.: 714,996

[22] Filed: Jun. 14, 1991

Related U.S. Application Data

[63] Continuation of Ser. No. 385,287, Jul. 26, 1989, abandoned.

[30] Foreign Application Priority Data

Jul. 29, 1988 [JP] Japan ................... 63-189834

[51] Int. Cl.$^5$ ............... C01B 31/00; C10B 55/08
[52] U.S. Cl. ................... 208/126; 208/127; 201/23; 423/445; 423/460; 423/447.1
[58] Field of Search ........ 208/126, 127, 131; 201/23; 423/445, 449, 460, 447.1, 447.2; 264/29.1, 29.5

[56] References Cited

U.S. PATENT DOCUMENTS

| | | | |
|---|---|---|---|
| 3,431,197 | 3/1969 | Jahnig et al. | 208/127 |
| 3,573,086 | 6/1970 | Lambdin | 264/29.2 |
| 4,026,998 | 5/1977 | Jorro et al. | 264/29.1 |
| 4,082,650 | 4/1978 | Li | 208/131 |
| 4,759,977 | 7/1988 | Fukuda | 264/29.1 |
| 4,861,575 | 8/1989 | Levan | 264/29.5 |

FOREIGN PATENT DOCUMENTS

| | | | |
|---|---|---|---|
| 609457 | 11/1960 | Canada | 208/127 |
| 0297695 | 1/1989 | Japan | 264/29.5 |
| 01568 | 8/1980 | PCT Int'l Appl. | 208/131 |
| 01569 | 8/1980 | PCT Int'l Appl. | 208/131 |

*Primary Examiner*—Michael Lewis
*Assistant Examiner*—Stephen G. Kalinchak
*Attorney, Agent, or Firm*—Oblon, Spivak, McClelland, Maier & Neustadt

[57] ABSTRACT

A process for producing coke, which comprises uniformly dispersing and mixing a carbonized product having an average aspect ratio of at least 1.5 to a starting material oil and then coking the mixture.

7 Claims, No Drawings

PROCESS FOR PRODUCING COKE

This application is a continuation of application Ser. No. 07/385,287, filed on Jul. 26, 1989, now abandoned.

BACKGROUND OF THE INVENTION

1. FIELD OF THE INVENTION

The present invention relates to a process for producing coke. More particularly, it relates to a process for producing coke for a carbon artifact such as a graphite electrode or a carbon brush, particularly needle coke which is used in a large amount primarily as particulate carbon material for electrodes.

2. DISCUSSION OF BACKGROUND

Carbon artifacts such as graphite electrodes or carbon brushes are produced usually by pulverizing particles of carbon material such as various calcined coke including pitch coke and petroleum coke, noncalcined coke being an intermediate product thereof, natural graphite and/or carbon black, to adjust the particle size, then kneading it together with a binder such as binder pitch under heating, and molding it, followed by baking at a temperature of from 800° to 1,300° C., and if necessary, further followed by graphitization treatment at a temperature of from 2,500° to 3,000° C.

The coke used as particulate carbon material for the production of carbon artifacts, is produced usually by coking a starting material oil such as petroleum heavy oil, naturally produced gilsonite or coal tar pitch by a method such as a fluid coking method, a flex coking method or a delayed coking method. In recent years, the conditions under which carbon artifacts including graphite electrodes for steel making are used, have become severe, and the quality required for the carbon artifacts, particularly the heat shock resistance, tends to be high. Accordingly, it has been common to employ needle coke obtained by coking petroleum pitch or coal pitch from which quinoline insolubles have been removed, by the delayed coking method.

Recently, for the production of carbon artifacts, it has been common to employ a quick graphitization method, in which a carbon material is rapidly heat treated in a short time, for the purpose of energy saving. However, with a carbon artifact produced by using needle coke produced by a conventional method as carbon material, abnormal expansion or a puffing phenomenon is likely to appear during the quick graphitization, whereby cracks are likely to form, or if cracks do not form, the apparent specific gravity is likely to be small, whereby no adequate strength will be obtained.

A number of attempts have been made to suppress the puffing phenomenon during the quick graphitization treatment by adding various additives to the starting material oil. However, no adequate results have been obtained.

When the particulate carbon material used is other than needle coke, there will be no problem of puffing. However, in view of the severe condition under which the carbon artifact is used, a coke is desired which is capable of providing adequate strength to the carbon artifact when it is used as particulate carbon starting material for the production of the carbon molded production.

SUMMARY OF THE INVENTION

The present inventors have conducted extensive research to solve the above-mentioned problems. As a result, it has been found that when coking is conducted after uniformly dispersing and mixing a carbonized product such as carbon fibers or needle coke having a average aspect ratio of at least 1.5 to a starting material oil, the strength of the resulting coke and the strength of the carbon artifact obtained by using such coke as the particulate carbon material, can be improved. Particularly, when the coke is needle coke, it is possible to obtain needle coke which scarcely undergoes puffing during the baking at a high temperature. Thus, it is possible to produce a carbon artifact having a high density and high strength while minimizing the formation of defects such as cracks or rupture of the carbon artifact. The present invention has been accomplished on the basis of these discoveries.

Namely, it is an object of the present invention to provide coke having high strength which is capable of producing a carbon artifact of high strength when used as particulate carbon material, particularly needle coke which scarcely undergoes puffing even during the baking at high temperatures and which is useful as a starting material for a carbon artifact having a high density and high strength.

Such an object of the present invention can readily be attained by a process for producing coke, which comprises uniformly dispersing and mixing a carbonized product having an average aspect ratio of at least 1.5 to a starting material oil and then coking the mixture.

DETAILED DESCRIPTION OF THE PREFERRED EMBODIMENTS

Now, the present invention will be described in detail.

Any starting material oil commonly used for the production of coke may be used as the starting oil for the present invention without any particular restriction. Specifically, when the coke to be produced is needle coke, coal tar or coal tar pitch, petroleum heavy oil, a liquefied coal product, or a residual oil from the decomposition of naphtha, may be employed. When quinoline insolubles are contained in a substantial amount in the starting material, they preferably have to be removed before use.

As the carbonized product having an average aspect ratio (length/diameter) of at least 1.5 to be used in the present invention, any carbonized product having a dimensional anisotropy may be employed. Specifically, there may be mentioned various carbon fibers such as pitch based carbon fibers, polyacrylonitrile based carbon fibers or carbon fibers formed by the vapor phase thermal decomposition of a hydrocarbon compound (VGCF), or a carbonized product such as carbon wiskers or needle coke, which has an average aspect ratio of at least 1.5, preferably from 15 to 3,000, more preferably from 200 to 2,000.

If the aspect ratio is less than 1.5, no substantial effect for suppressing expansion during graphitization will be obtained, and accordingly, no adequate effect for improving the strength of the desired product will be obtained. On the other hand, if the aspect ratio is too high, the fibers of the carbonized product tend to become entangled and are very difficult to uniformly disperse into and to mix with the starting material oil.

Here, the carbonized product is usually heat-treated at a temperature of at least 500° C., preferably at least 1,000° C., and in some cases includes a graphitized product heat-treated at a temperature of at least 2,000° C. It is the feature of the present invention to conduct coking after uniformly dispersing and mixing the carbonized product having an average aspect ratio of at least 1.5 to the above-mentioned starting material oil. The mixing ratio is usually from 0.01 to 30 parts by weight, preferably 0.05 to 5 parts by weight, per 100 parts by weight of the starting material oil.

Such a carbonized product is preferably adequately uniformly mixed with the starting material oil. Such mixing can be conducted by a usual method by means of line mixer, a homo mixer, a motor-driven stirrer.

For coking the starting material oil to produce coke for a carbon artifact, several methods are known including a fluid coking method, a flex coking method and a delayed coking method. In the present invention, any method for coking the starting material oil including such conventional coking methods, may be employed for coking the uniform mixture of the above-mentioned starting material oil and carbonized product. However, for the production of pitch coke or needle coke, it has been common to employ a delayed coking method in which a starting material oil is introduced from the bottom of the coker (heat treatment reactor) and coking is conducted gradually over a period of from 12 to 48 hours at a temperature of from 400° to 600° C., preferably from 450° to 500° C., under a pressure of atmospheric pressure to 10 kg/cm$^2$ while removing low boiling point components.

Green coke thus obtained usually contains from 3 to 20% by weight of a volatile component. Such green coke may be used as it is, as carbon starting material for a carbon artifact. However, it may be calcined at a high temperature to remove the volatile component and moisture and then used in the form of calcined coke as the starting material for the production of a carbon artifact.

The process of the present invention has a feature that coking is conducted after uniformly dispersing and mixing a carbonized product having an average aspect ratio of at least 1.5 into a starting material oil and may include any method for producing coke regardless of the type of starting material oil or the manner of coking so long as such a method has said feature. Said feature presents such an effect that the strength of a carbon artifact produced by using said coke as the particulate carbon starting material, can be improved by the carbonized product uniformly dispersed and mixed in the produced coke, which serves as cores. The present invention is most effective when applied to a method for producing needle coke, in that puffing which used to be problematic, is thereby suppressed so that cracking or rupture of the carbon artifact can be prevented and the strength of the product can be remarkably improved.

Now, the present invention will be described in further detail with reference to Examples. However, it should be understood that the present invention is by no means restricted to such specific examples.

EXAMPLE 1

To 100 parts by weight of coal tar pitch, 0.3 part by weight of carbon fibers cut in a length of 3 mm and having a fiber diameter of 10 μm and an elastic modulus in tension of 15 ton/mm$^2$, were added and dispersed by a homomixer. The mixture was charged into an autoclave having an internal capacity of 6 l and heated to 500° C. over a period of 18 hours in an electric furnace and treated at 500° C. for 5 hours. Then, the autoclave was cooled, and the contents were removed. The contents were coke containing 6% of a volatile component. Then, this coke was put in an alumina container with a cover and treated at 1,300° C. for two hours in a separate electric furnace to obtain calcined coke. The calcined coke was further heated to 2,700° C. at a rate of 20° C./min for graphitization. The porosities of the coke after graphitization and of calcined coke were measured by a mercury porosimeter, and the porosity formed during the graphitization treatment was calculated from the difference therebetween and found to be 63 mcc/g.

EXAMPLES 2 AND 3

Calcined coke and graphitized coke were prepared by the same treatment as in Example 1 except that the amount of carbon fibers added to 100 parts by weight of the coal tar was changed to 0.1 part by weight or 3 parts by weight. In each case, the porosity formed during the graphitization treatment was determined in the same manner as in Example 1. The results are shown in Table 1.

COMPARATIVE EXAMPLES 1 TO 3

Calcined coke and graphitized coke were prepared by the same treatment as in Example 1 except that only coal tar was used as the starting material without adding carbon fibers or coke powder as identified in Table 1 was added instead of the carbon fibers. The porosity formed during the graphitization treatment is shown in Table 1.

EXAMPLES 4 AND 5

The same treatment as in Example 1 was conducted except that instead of the carbon fibers, 1 part by weight or 3 parts by weight of green coke having a particle size of from 74 to 44 mesh being needle coke of coal tar pitch origin and having a dimensional anisotropy of 1.7, was mixed to 100 parts by weight of coal tar pitch, and the porosity during the graphitization treatment was measured by a mercury porosimeter and calculated. The results are shown in Table 1.

EXAMPLES 6 AND 7

The same treatment as in Example 1 was conducted except that instead of the carbon fibers, 1 part by weight or 3 parts by weight of calcined coke having a particle size of from 74 to 44 mesh being needle coke of coal tar pitch origin and having a dimensional anisotropy of 1.85, was added to 100 parts by weight of coal tar pitch, and the porosity formed during the graphitization treatment was measured by a mercury porosimeter and calculated. The results are shown in Table 1.

TABLE 1

| | Additive | Aspect ratio of additive | Amount of additive (parts by weight) | Mercury porosity (mcc/g) |
| --- | --- | --- | --- | --- |
| Example 1 | Carbon fibers | 300 | 0.3 | 67 |
| Example 2 | Carbon fibers | 300 | 0.1 | 50 |
| Example 3 | Carbon fibers | 300 | 3 | 13 |
| Example 4 | Green coke | 1.70 | 1 | 51 |
| Example 5 | Green coke | 1.70 | 3 | 46 |
| Example 6 | Calcined coke | 1.85 | 1 | 50 |
| Example 7 | Calcined coke | 1.85 | 3 | 49 |
| Comparative Example 1 | Nil | — | — | 83 |

TABLE 1-continued

|  | Additive | Aspect ratio of additive | Amount of additive (parts by weight) | Mercury porosity (mcc/g) |
| --- | --- | --- | --- | --- |
| Comparative Example 2 | carbon powder | 1.0 | 0.1 | 81 |
| Comparative Example 3 | carbon powder | 1.0 | 1.0 | 80 |

According to the present invention, coke having low porosity and high density can be produced wherein a carbonized product such as needle coke and/or carbon fibers having an average aspect ratio of at least 1.5 is uniformly dispersed and mixed. By using such coke as particulate carbon starting material, it is possible to obtain a carbon artifact having high strength with such carbonized product serving as cores. Particularly, in the case where the coke for the carbon artifact is needle coke, it is possible to suppress puffing during a high temperature baking for e.g. graphitization, which used to be problematic, whereby production of defective products can be minimized, and it is possible to produce a carbon artifact having a high density and high strength. Thus, the present invention provides a substantial industrial merit.

What is claimed is:

1. A process for producing a coke, which comprises:
uniformly dispersing and mixing 0.05 to 5 parts by weight of a carbonized product having an average aspect ratio of at least 1.5 and selected from the group consisting of pitch-based carbon fibers, polyacrylonitrile-based carbon fiber and carbon fibers formed by the vapor phase thermal decomposition of a hydrocarbon compound with 100 parts by weight of a starting material oil, and then coking the mixture by heating the mixture up to a temperature within the range of from 400° to 600° C. and maintaining the temperature within this range for an overall coking period of from 12 to 48 hours.

2. A process for producing a pitch-based coke, which comprises:
uniformly dispersing and mixing 0.05 to 5 parts by weight of a carbonized product having an average aspect ratio of at least 1.5 and selected from the group consisting of pitch-based carbon fibers, polyacrylonitrile-based carbon fibers and carbon fibers formed by the vapor phase thermal decomposition of a hydrocarbon compound with 100 parts by weight of a starting material oil, and then coking the mixture by heating the mixture up to a temperature within the range of from 400° to 600° C. and maintaining the temperature within this range for an overall coking period of from 12 to 48 hours.

3. A process for producing a needle coke which comprises:
uniformly dispersing and mixing 0.05 to 5 parts by weight of a carbonized product having an average aspect ratio of at least 1.5 and selected from the group consisting of pitch-based carbon fibers, polyacrylonitrile-based carbon fibers and carbon fibers formed by the vapor phase thermal decomposition of a hydrocarbon compound with 100 parts by weight of a starting material oil, and then coking the mixture by heating the mixture up to a temperature within the range of from 400° to 600° C. and maintaining the temperature within this range for an overall coking period of from 12 to 48 hours.

4. The process according to claim 3, wherein the carbonized product has an average aspect ratio of from 200 to 2,000.

5. The process according to claim 3, wherein the carbonized product has an average aspect ratio of from 15 to 3,000.

6. The process according to claim 3, wherein the carbonized product has been heat-treated at a temperature of at least 500° C.

7. The process according to claim 3, wherein the starting material oil is coal tar, coal tar pitch, petroleum heavy oil, a liquefied coal product or a residual oil from the decomposition of naphtha.

* * * * *